No. 842,418. PATENTED JAN. 29, 1907.
D. M. ORCUTT.
PITLESS WEIGHING SCALE.
APPLICATION FILED JAN. 16, 1906.
2 SHEETS—SHEET 1.
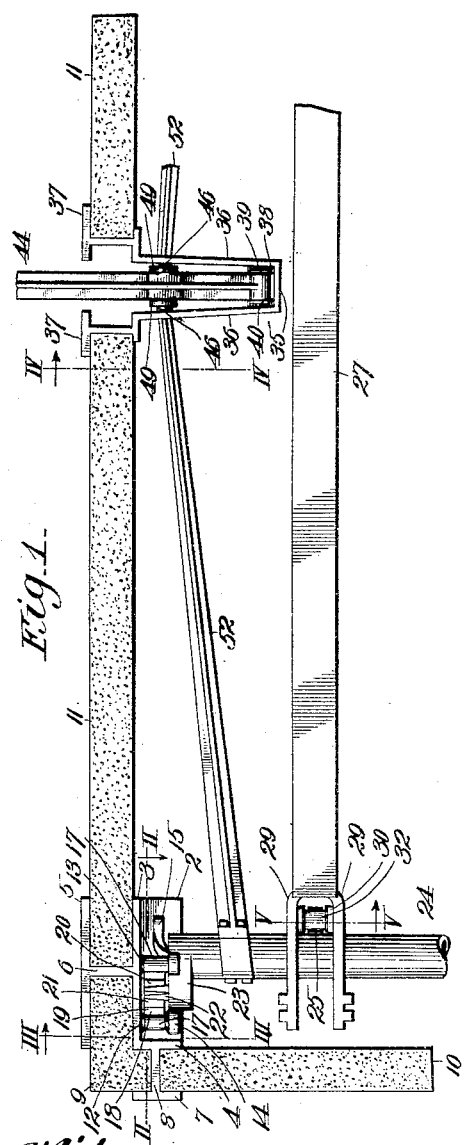

No. 842,418. PATENTED JAN. 29, 1907.
D. M. ORCUTT.
PITLESS WEIGHING SCALE.
APPLICATION FILED JAN. 16, 1906.
2 SHEETS—SHEET 2.
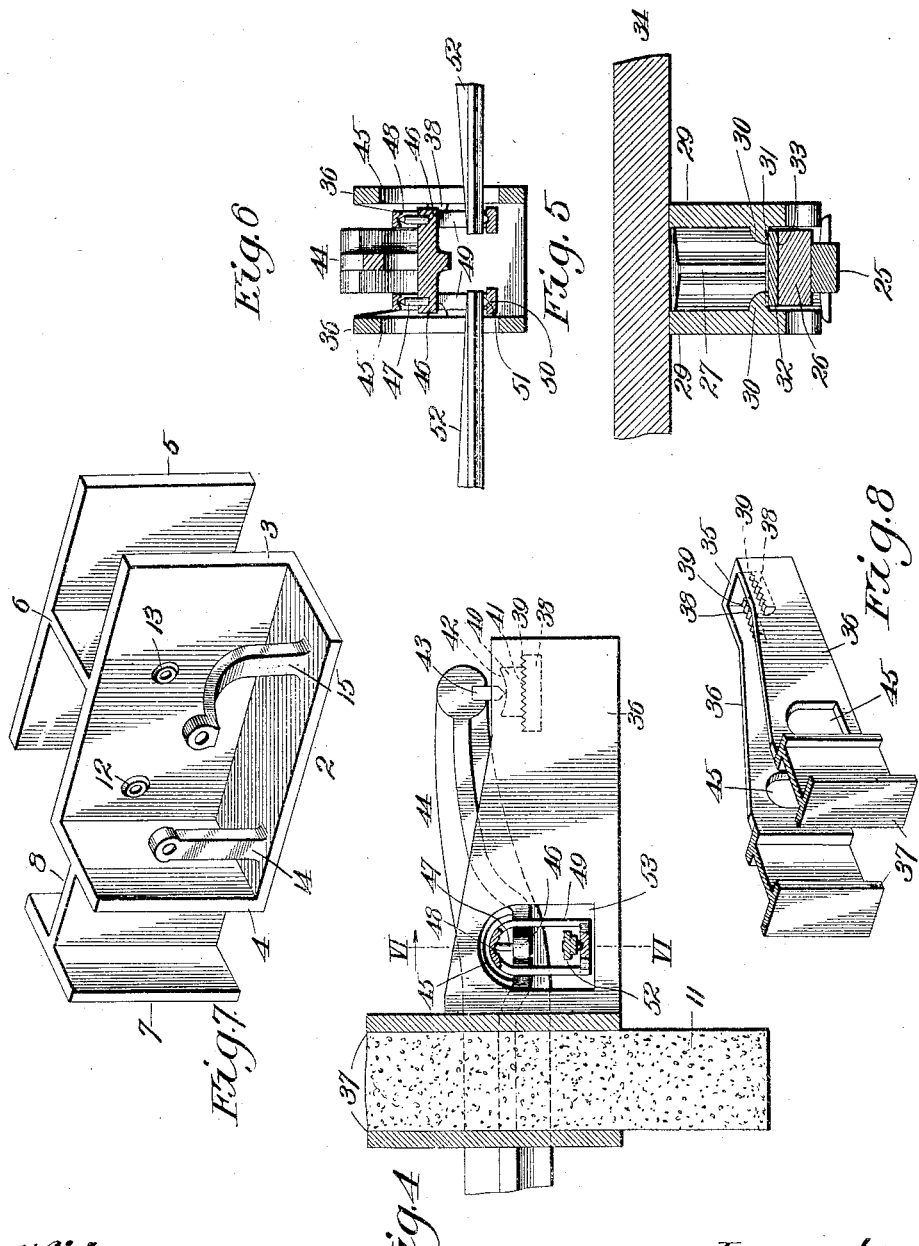
Witnesses
Frank P. Glou
H. C. Rodgers
Inventor
D. M. Orcutt.
By George H. Thorpe
atty

UNITED STATES PATENT OFFICE.

DARIUS M. ORCUTT, OF KANSAS CITY, KANSAS.

PITLESS WEIGHING-SCALE.

No. 842,418.  Specification of Letters Patent.  Patented Jan. 29, 1907.

Application filed January 16, 1906. Serial No. 296,259.

*To all whom it may concern:*

Be it known that I, DARIUS M. ORCUTT, a citizen of the United States, residing at Kansas City, in the county of Wyandotte and State of Kansas, have invented certain new and useful Improvements in Pitless Weighing-Scales, of which the following is a specification.

This invention relates to weighing-scales, and more especially to that class known as "pitless" weighing-scales; and my object is to produce a scale of this character provided with a combination cement and metal frame.

A further object is to produce a scale of this character in which the bearings for the platform portion of the scale are adjustable longitudinally and laterally to accommodate any inaccuracy in the erection of the scale or which occurs after it has been erected.

A further object is to produce a scale of this character in which the scale-beam lever is adjustable transversely of the platform to accommodate the position of the rocker-shaft arms in order to insure accuracy in the weighing operation.

With these and other objects in view, as hereinafter appear, the invention consists in certain novel and peculiar features of construction and organization, as hereinafter described and claimed, and in order that it may be fully understood reference is to be had to the accompanying drawings, in which—

Figure 1 is a plan view of a portion of a scale, with the platform omitted, embodying my invention. Fig. 2 is an enlarged section taken on the line II II of Fig. 1. Fig. 3 is an enlarged section taken on the line III III of Fig. 1. Fig. 4 is an enlarged section taken on the line IV IV of Fig. 1, but with one of the stirrups partly in section to disclose features of construction hereinafter described. Fig. 5 is an enlarged vertical section taken on the line V V of Fig. 1. Fig. 6 is a section taken on the line VI VI of Fig. 4. Fig. 7 is a detail perspective view of one of the corner-brackets of the frame. Fig. 8 is a sectional perspective view of the bracket for the scale-beam lever.

Referring to the drawings in detail, where like reference characters indicate corresponding parts, 1 indicates cement beds or foundations for each corner of the frame, one bed only being disclosed. Secured upon each cement-bed is a corner-bracket constructed as follows: 2 indicates a bed-plate provided, respectively, at its outer side and end with vertical walls 3 and 4. Wall 3 is paralleled by an outer wall 5, connected to wall 3 by a cross-piece or rib 6. Wall 4 is paralleled by an outer wall 7, connected to wall 4 by a cross-piece or rib 8.

9 indicates an angular cement wall of the same height as and extending from cross-piece or rib 6 to cross-piece or rib 8 and snugly embraced by the contiguous portions of the inner and outer walls 3 4 and 5 7, and 10 indicates cement end walls, one only appearing, extending from the cross-piece or rib 8 to the corresponding cross-piece or rib of the corner-bracket (not shown) at the same end of the frame. 11 indicates cement side walls extending from cross-piece or rib 6 of one corner-bracket to the cross-piece or rib of the corner-bracket (not shown) at the opposite end of the frame. The corner-walls 9 and those portions of walls 10 and 11 between walls 4 and 7 and 3 and 5, respectively, rest upon and practically form upward extensions of the underlying portions of the beds 1, which, it will be noted, are wider than said walls to wholly underlie the bed-plates 2. One of said side cement walls is in two sections, terminating a suitable distance apart, as shown in Fig. 1, the sections of said wall being connected by a bracket hereinafter described. All of said cement walls are preferably of the same height as the metal walls 3 and 5, and, if desired, said cement walls may extend downward into the ground to lend additional stability and rigidity to the frame, though they are not so shown, as the depth of said walls forms no part of the invention.

The inner wall 3 of each corner-bracket is preferably provided with a pair of perforated bosses 12 13, which are disposed in alinement with the perforated heads of standards 14 and 15, respectively, rising from the bed-plate 2, the standard 15 being of semi-arched form and having its major portion disposed some distance inward of its perforated head for a purpose which hereinafter appears.

16 indicates pivot-bolts connecting bosses 12 and 13 with the heads of standards 14 and 15 and secured at their ends in the perforations of said bosses and standards.

A swinging hanger for each corner-bracket comprises a pair of swing-bars 17, pivotally suspended from bolts 16 and pivotally engaging the bifurcated ends of a horizontal link 18, having its upper surface corrugated transversely, as at 19. 20 indicates a bearing-block having its lower side likewise corrugated and engaging the corrugated upper surface of link 18, said block being preferably shorter than the corrugated portion of the link, so as to be adjustable longitudinally thereon. The width of said link and block is such as to also permit of a limited lateral adjustment of the block on the link, and the block is provided in its upper side with a transverse bearing-cavity 21 to receive the knife-bearing 22, projecting outward from the arm 23 of the rock-shaft 24, one rocker-shaft only appearing, though of course there will be another contiguous to and parallel with the other end wall of the frame. Each rock-shaft is likewise provided a suitable distance from each end with an arm 25, projecting in the opposite direction from arm 23 and equipped at its upper side with a transverse knife-bearing 26.

27 indicates longitudinal beams, preferably I-beams, in longitudinal alinement with the alined arms 25 of the rocker-shafts, one I-beam only being shown, and secured to each end of each I-beam are a pair of plates 28, provided with arms 29, of such configuration as to overhang and project outwardly beyond the rocker-shafts, as shown most clearly in Figs. 1 and 2, and formed integral by preference with the inner sides of arms 29 inward of the contiguous rocker-shaft are a pair of longitudinal ribs 30, having their lower sides transversely corrugated, as at 31.

32 indicates a bearing-block bridging the space between companion arms 29 and having its upper side transversely corrugated and engaging the corrugations of ribs 30, the lower side of said bearing-block being concaved, as at 33, and resting upon the knife-bearing 26 of rocker-shaft arms 25, said bearing-blocks 32 being longitudinally adjustable on the bearing-ribs 31.

The platform (indicated at 34) is preferably constructed of planks extending transversely of the scale and secured in the usual or any preferred manner to the I-beams and the arms 29 projecting beyond the same.

From the foregoing it will be apparent by reference to the drawings that the platform may vibrate longitudinally of the scale in the usual manner, the hangers swinging to permit this vibration without causing the links 18 thereof to assume angular positions with respect to the base-plates, and therefore without imposing undue resistance to the vibratory movement of the platform. The platform, furthermore, has the necessary vertical or up-and-down movement without causing it to assume an angular position with respect to the base-plates, the rocker-shaft bearing knives 22, fulcruming on the bearing-blocks 20, the knife-bearing 26 and bearing-blocks 32 rising and falling with the platform and operating together with the minimum of friction, as will be readily understood.

The bracket which forms the fulcrum of the scale-beam lever is disposed transversely and consists of an end wall 35, side walls 36 projecting outwardly from the ends of wall 35 and diverging outwardly slightly by preference and terminating at their outer ends in substantially I-shaped portions 37, the bases of said I portions being alined with side walls 3 of the corner-brackets and the heads with the outer side walls 5 of the corner-brackets, the contiguous ends of the cement side-wall sections 11 fitting between said bases and heads and abutting against the stem portions connecting said bases and heads, as shown clearly in Fig. 1.

The bracket is provided integrally at the junction of walls 35 and 36 with ribs 38, extending transversely of the scale and corrugated longitudinally of the scale at their upper sides, as at 39, and bridging the space between and supported by said ribs is a bearing-block 40, having its lower surface corrugated, as at 41, to engage the corrugations 39, the block 40 being adjustable on ribs 38 transversely of the scale and also having its upper side formed with a bearing-cavity 42, engaged by the depending knife-bearing 43, secured to the inner end of the scale-beam lever 44, which lever extends longitudinally of its supporting-bracket and projects beyond the sections of wall 11, its opposite end being connected in the usual or any preferred manner to the scale-beam. (Not shown.) The lever inward of the side wall beyond which it projects is provided with a transverse opening 45 for gaging purposes in the shop work.

At opposite sides of said opening the lever is provided with outwardly-projecting lugs 46, provided with upwardly-projecting cone-pointed bearing-pins 47, engaging cavities 48 in the upper ends of stirrups 49, the lower portions of said stirrups being provided with cavities 50, engaged by depending cone-pointed bearing-pins 51 of arms 52, secured rigidly to the rocker-shafts in any suitable manner and projecting through large openings 53 in the side walls 36 of the bracket forming the fulcrum or support of said lever.

Should the arms 57 through inaccuracy of construction or of fit have their inner or contiguous ends disposed outward or inward of the vertical plane which they scientifically should occupy, the large openings 53 will accommodate them, and the bearing-block 40 of lever 44 will be adjustable transversely of the scale on ribs 38 to accommodate the positions of said arms, as will be readily understood, the movement of the rocker-shafts being transmitted to lever 44 through the instrumentality of arms 52 in the usual manner, lateral and longitudinal vibratory movement of the platform independent of the lever 44 being accommodated by transverse swinging movement of the stirrups, as is customary in this class of scales.

Among the special advantages of a scale of this character is compactness for shipment, as the heavy and cumbersome side and end channel-irons usually forming an important part of a scale of this character are dispensed with. The cement side and end walls, corner portions 9, and foundation for the corner-brackets can be erected easily and cheaply with the aid of any suitable false work or forms, (not shown,) it being understood that a pitless scale having its frame composed of the usual channel-iron sides and ends is erected upon a cement foundation and that consequently the production of the cement walls as contemplated herein can be accomplished without necessitating anything but a larger quantity of the material for the erection of such walls and the building of the false work to a higher plane than where the cement forms the foundation only.

From the above description it will be apparent that I have produced a scale embodying the features of advantage enumerated as desirable in the statement of invention and which obviously may be modified in minor particulars without departing from the spirit and scope of the appended claims.

Having thus described the invention, what I claim as new, and desire to secure by Letters Patent, is—

1. In a weighing-scale, a frame comprising corner-brackets provided with inner side and end walls and outer side and end walls integrally connected, cement end walls connecting and extending between the end walls of the brackets, and cement side walls connecting and extending between the side walls of the brackets.

2. In a weighing-scale, a frame, comprising corner-brackets provided with inner side and end walls and outer side and end walls integrally connected, cement end walls connecting and extending between the end walls of the brackets, cement side walls connecting and extending between the side walls of the brackets, and an angular cement wall having a side portion extending between the side walls of each bracket, and an end portion extending between the end walls of the bracket.

3. In a weighing-scale, swinging hangers suitably supported, a link pivotally connecting said hangers, and a bearing-block carried by and adjustable longitudinally of said link.

4. In a weighing-scale, swinging hangers suitably supported, a link pivotally connecting said hangers, and a bearing-block carried by and adjustable transversely of said link.

5. In a weighing-scale, swinging hangers suitably supported, a link pivotally connecting said hangers, and a bearing-block carried by and adjustable longitudinally and transversely of said link.

6. In a weighing-scale, a pair of hangers suitably supported, a link pivotally connecting said hangers and having its upper side transversely corrugated, and a bearing-block having its under side transversely corrugated and engaging the corrugated upper side of the link.

7. In a weighing-scale, a corner-bracket provided with a pair of standards, parallel bolts connecting said standards with a wall of said bracket, hangers pivotally pendent from said bolts, a link pivotally connecting said hangers, and a bearing-block mounted on said link.

8. In a weighing-scale, a corner-bracket provided with a pair of standards, parallel bolts connecting said standards with a wall of said bracket, hangers pivotally pendent from said bolts, a link pivotally connecting said hangers and having its upper side transversely corrugated, and a bearing-block having its under side transversely corrugated, and engaging said corrugated upper side of the link.

9. In a weighing-scale, a rocker-shaft, a swinging fulcrum therefor, an arm projecting inwardly therefrom and provided with an upwardly-projecting knife-bearing, a platform, ribs rigid with the platform and transversely corrugated at their under side, and a bearing-block having its upper side transversely corrugated and engaging the corresponding surface of the ribs and resting on said knife-bearing.

10. In a weighing-scale, a platform, rocker-shafts supporting the same, arms projecting inwardly from the rocker-shafts, a rigid bracket provided with bearing-ribs extending transversely of the scale, a bearing-block supported by said ribs, a scale-beam lever fulcrumed on said block, and stirrups pivotally suspended from said lever and sustaining the downward pressure of said rocker-shaft arms.

11. In a weighing-scale, a platform, rocker-shafts supporting the same, arms projecting from the rocker-shafts, a bracket having openings through which the arms project, a scale-beam lever fulcrumed on said bracket inward of said openings and provided contiguous to the latter with outwardly-projecting lugs, bearing-pins projecting upward from said lugs, and stirrups pivotally suspended from said pins and having their lower ends forming a support for the contiguous ends of the rocker-shaft arms.

12. In a weighing-scale, a platform, rocker-shafts supporting the same, arms projecting from said shafts, a bracket having openings through which the arms project, a scale-beam lever fulcrumed on the bracket, stirrups pivotally pendent from said lever and capable of swinging longitudinally and transversely of the scale and provided with bearing-sockets in their lower ends, and pins depending from said arms and engaging said bearing-sockets.

13. In a weighing-scale, a bracket comprising an end wall, side walls projecting from the end wall and provided with openings, and ribs formed integral with and within the bracket at its closed end.

14. In a weighing-scale, a corner-bracket, comprising a base-plate, a side and an end wall rising from said plate, and standards integral with said base-plate and having their upper ends opposite and a suitable distance from said side wall.

15. In a weighing-scale, a corner-bracket, comprising a base-plate, a side and an end wall rising from said plate, standards integral with said base-plate and having their upper ends opposite and a suitable distance from said side wall, outer side and end walls, ribs connecting said side walls, and ribs connecting the end walls together.

In testimony whereof I affix my signature in the presence of two witnesses.

DARIUS M. ORCUTT.

Witnesses:
H. C. RODGERS,
G. Y. THORPE.